April 23, 1929.  W. OWEN  1,710,238

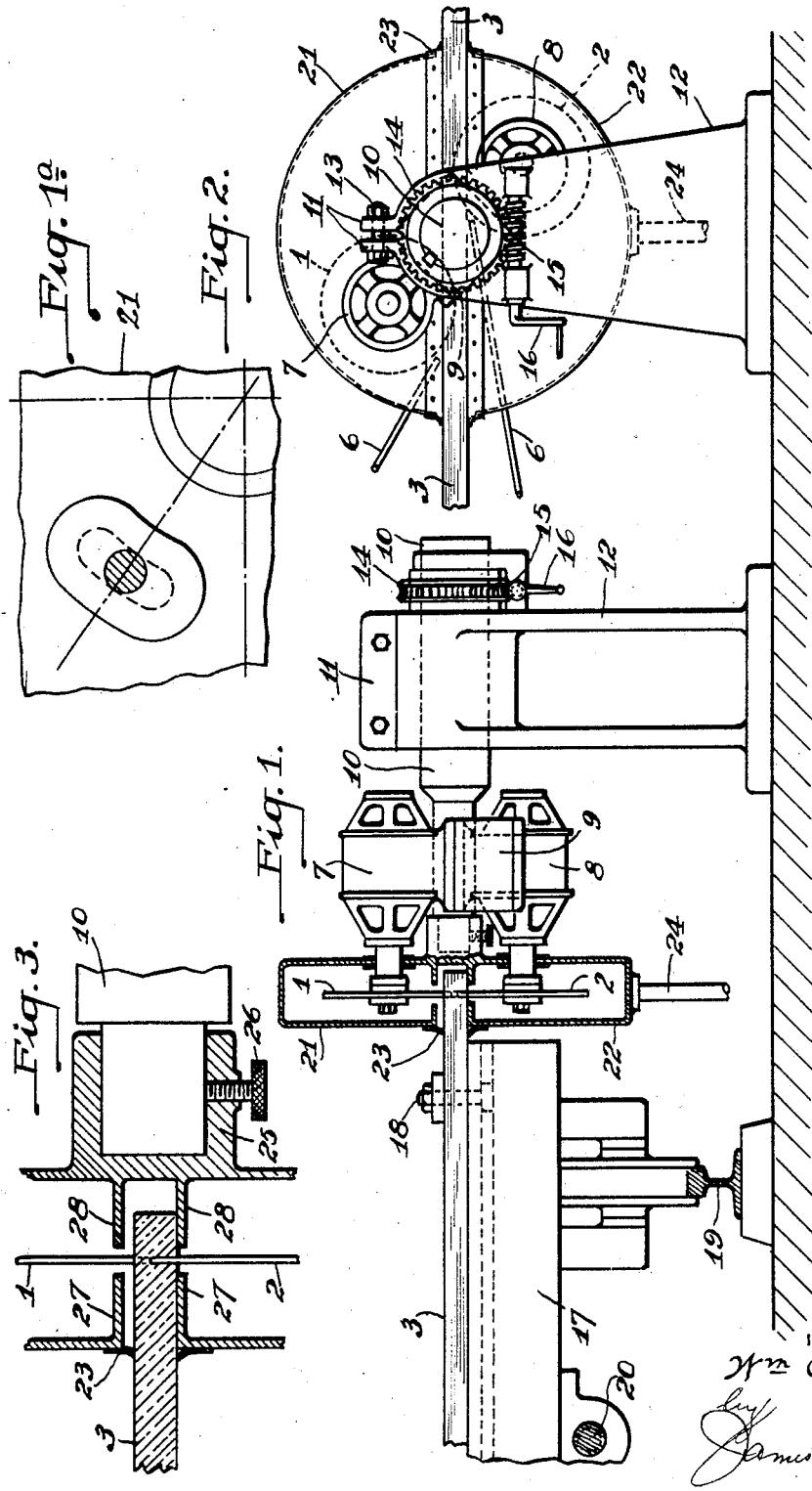

APPARATUS FOR SEVERING SHEETS

Filed Sept. 30, 1927  5 Sheets-Sheet 2

INVENTOR
Wm Owen
James L. Bradley
atty

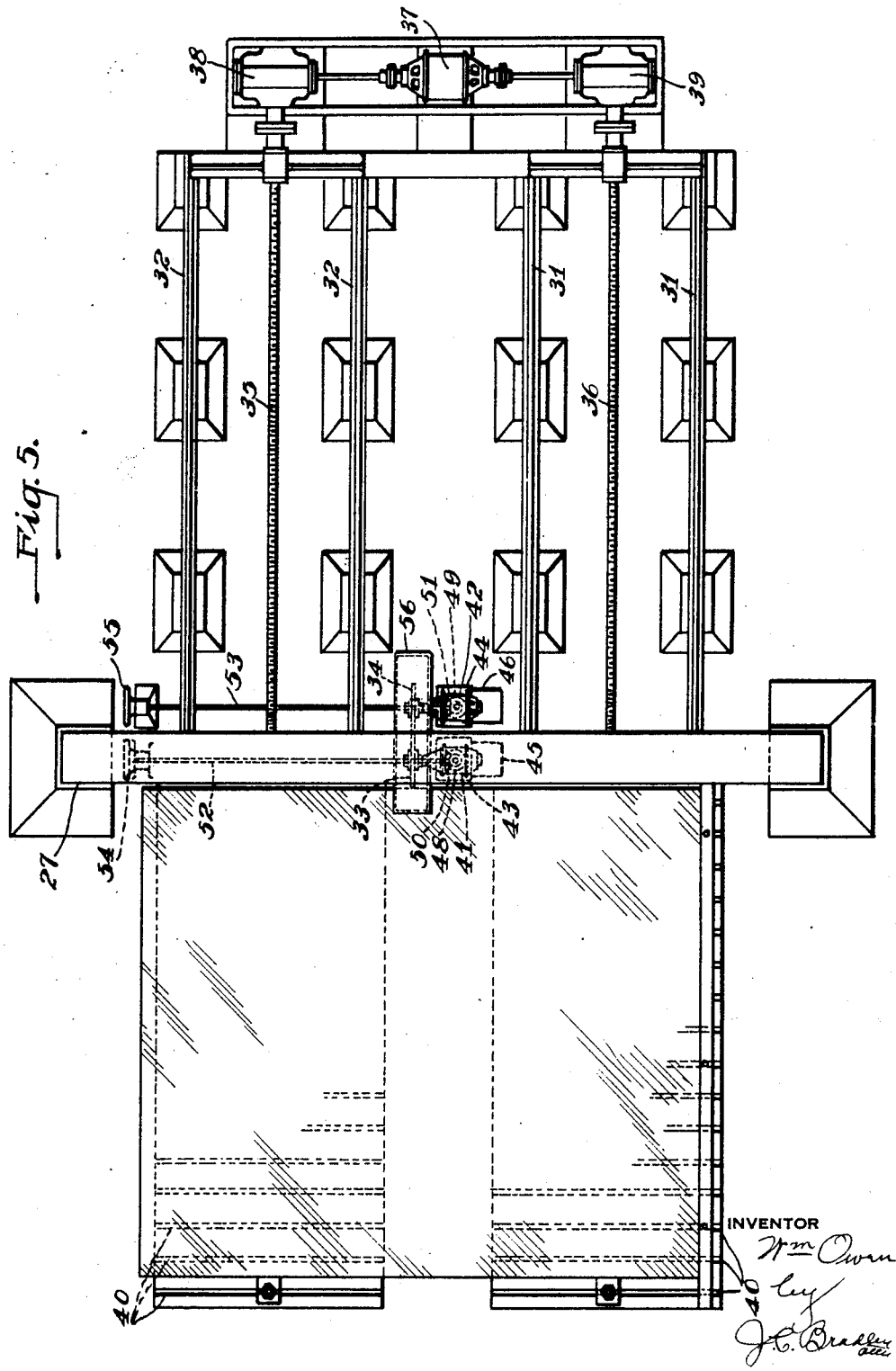

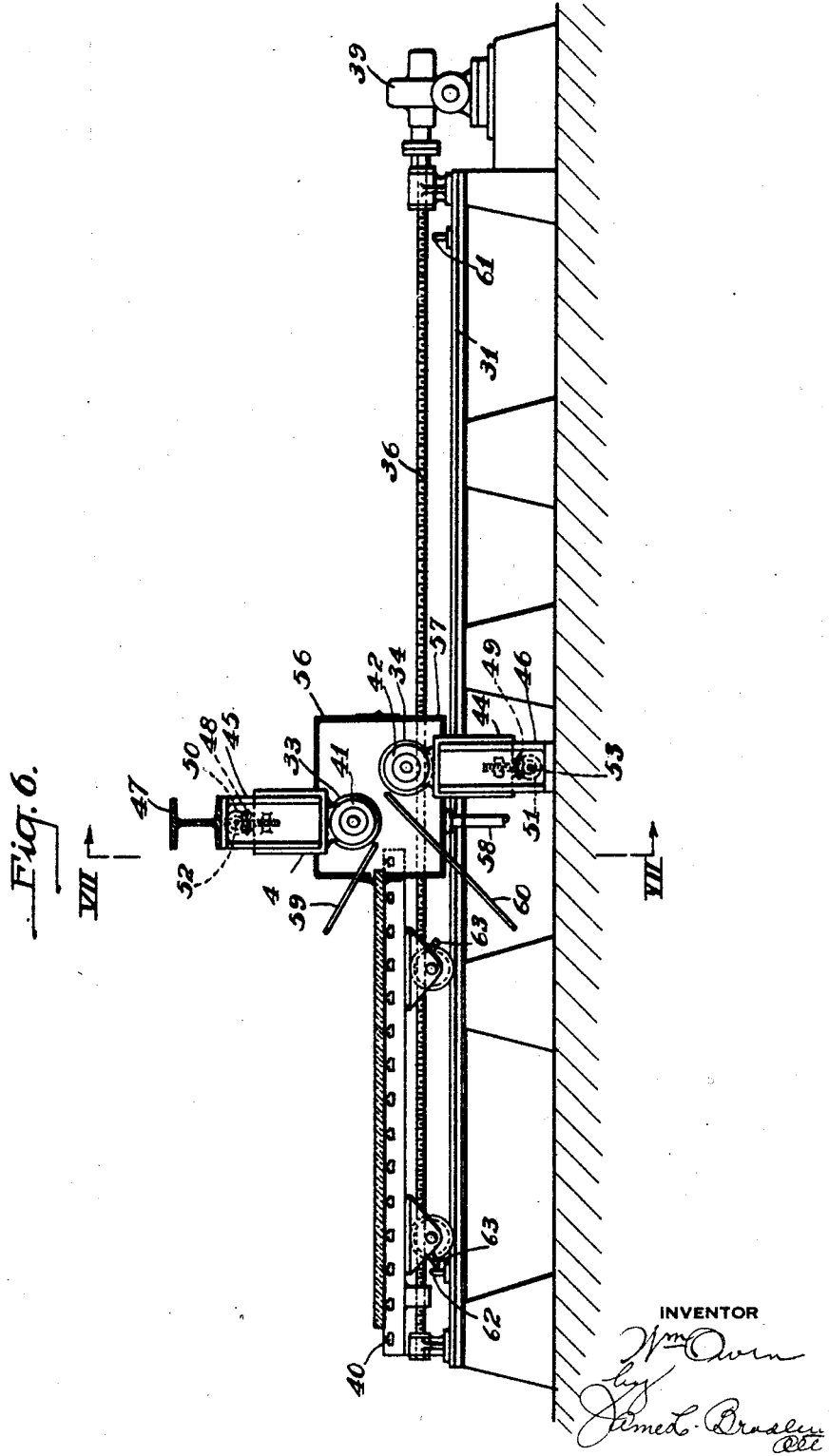

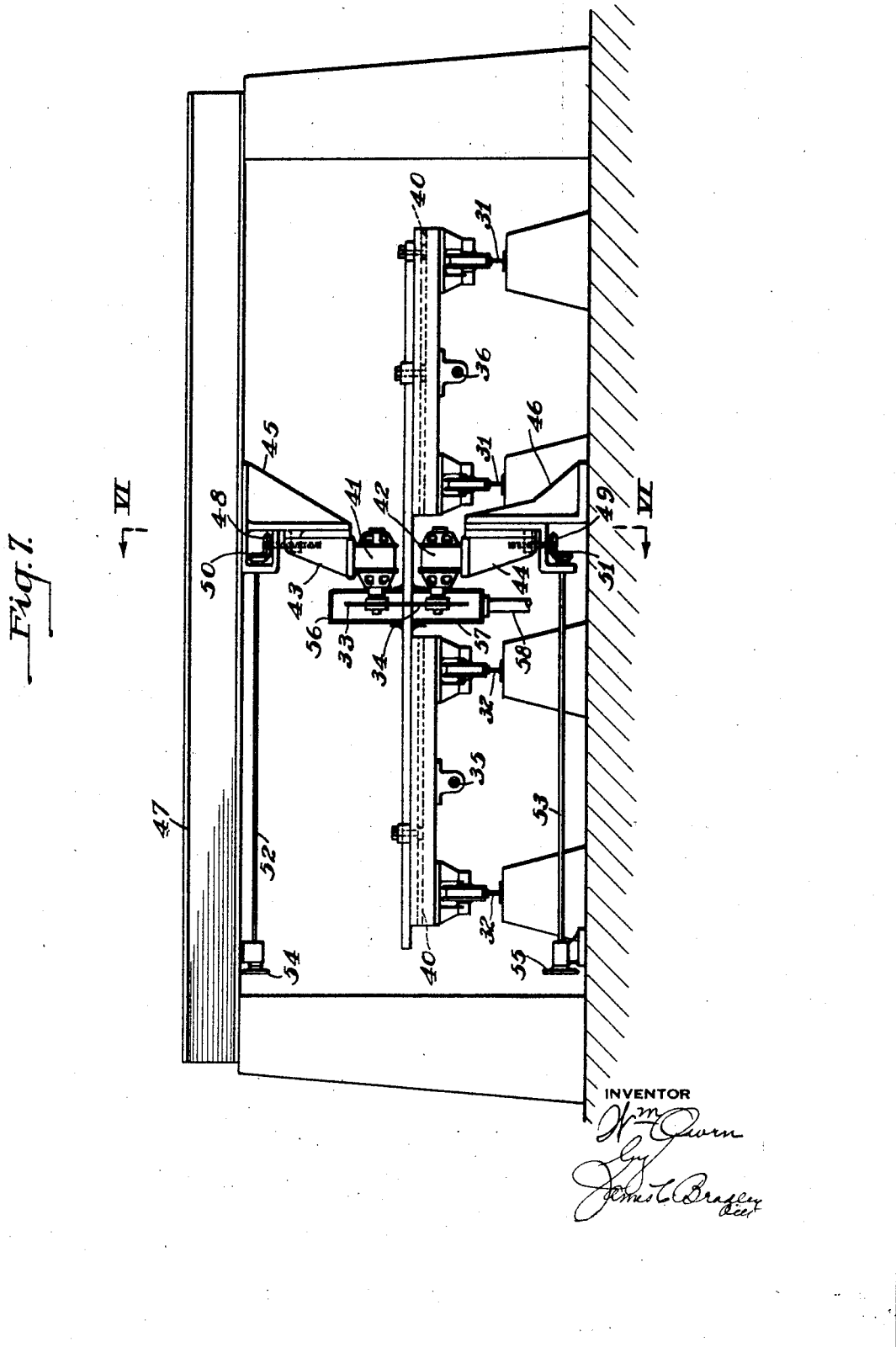

Patented Apr. 23, 1929.

1,710,238

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

APPARATUS FOR SEVERING SHEETS.

Application filed September 30, 1927. Serial No. 223,050.

Figure 4:
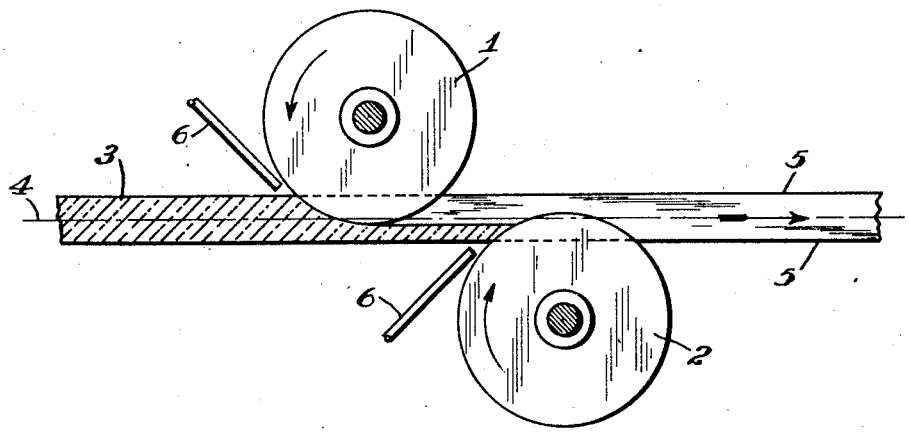
Figure 8:
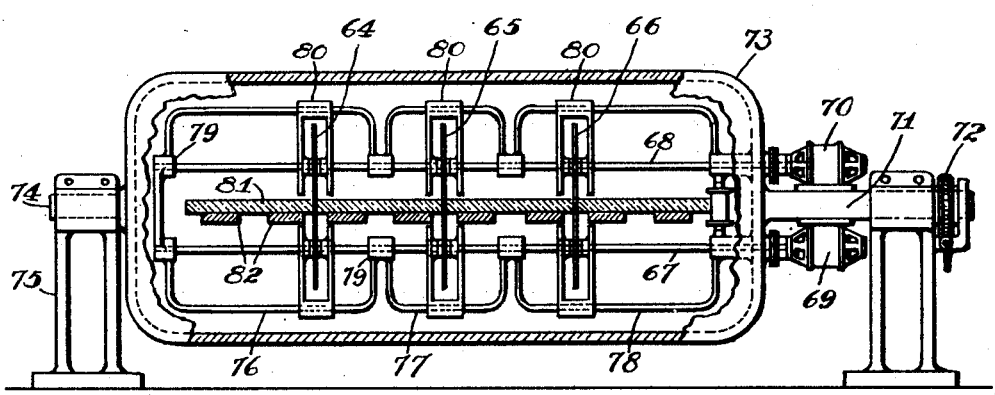

The invention relates to an apparatus for cutting hard brittle material, such as glass and marble, the invention being particularly designed for cutting or trimming thick sheets of Carrara glass. This material is now severed, by scoring with a diamond, or wheel, and then causing the glass to separate by tapping or hammering. The edges thus produced are very rough and uneven and a large amount of grinding is required in order to smooth the edge surface and true it up. The present invention is designed to cut or trim the glass by a cutting or sawing action, which leaves a perfectly true edge surface requiring only a slight amount of abrasion or polishing to give the final degree of finish demanded in a product of this kind. Briefly stated, this result is secured by the use of a pair of thin cutting wheels which operate in the same plane on opposite sides of the glass, such wheels being adjusted so that the cuts produced thereby overlap slightly. The use of two wheels instead of one (which cuts clear through) is necessary in order to avoid the chipping which occurs on the side of the glass on which the wheel emerges when a single wheel is used. Certain embodiments of the invention are illustrated in the accompanying drawings, wherein:

Figure 1 is a front view, partially in section of one form of apparatus for carrying out the invention. Fig. 1ª is a fragmentary rear view of one of the wheel guards. Fig. 2 is an end view. Fig. 3 is a detail section on an enlarged scale. Fig. 4 is another detail section on an enlarged scale. Figs. 5, 6 and 7 illustrate a modification, Fig 5 being a plan view, Fig. 6 a section on the line VI—VI of Fig. 7, and Fig. 7 a section on the line VII—VII of Fig. 6. And Fig. 8 is a vertical section through still another modification.

In all of the constructions, a pair of thin disc cutting wheels 1 and 2 are employed to cut the glass sheets, as indicated in Fig. 4. These wheels are placed in series on opposite sides of the sheet and so adjusted that in the cutting operation, the edges of the wheels overlap, both of such edges extending past the center line 4 of the sheet 3, as shown in Fig. 4. The use of the two wheels arranged in alignment in this manner and overlapping at their inner peripheries prevents any chipping of the glass, the corner edges 5, 5 of the sheet being perfectly sharp and smooth, while the surface of the edge between these two corners is so smooth and true that very little finishing is required in order to give the edges their final polish. The wheels 1 and 2 are preferably made of a bakelite base with carborundum particles embedded therein, as such wheels have the necessary strength and wearing qualities. However, any other suitable material may be employed, the wheels being driven at a high rate of speed and supplied with water through the pipes 6, 6.

In the form of construction shown in Figs. 1, 2 and 3, the wheels 1 and 2 are carried directly upon the shafts of the motors 7 and 8, and such motors are in turn carried upon a frame 9 supported by the motor arm 10. This arm extends through the sleeve 11 carried by the pedestal 12, such sleeve being split and provided with clamping bolts 13, so that the arm may be adjusted in a rotary direction and so govern the depth of cut made by each of the wheels 1 and 2. In order to adjust the arm 10, the right hand end thereof is provided with a worm wheel 14 adapted to be rotated by the worm 15, provided with the handle 16.

The sheet 3 in this case is carried upon a table or car 17, so that its edge projects between the two wheels, the sheet being clamped in position upon the table by means of suitable clamps 18. The table is mounted upon a track 19 and is preferably moved along such track by means of a screw 20 driven by any suitable power means carried by the table itself. Surrounding the two cutting wheels is a guard made up of the upper part 21 and the lower part 22 of sheet metal with suitable rubber lips 23 for making contact with the sheet 3 and preventing the escape of the water supplied to the wheels by means of the pipes 6, 6. The lower part of the guard is also provided with a drainage pipe 24 for conducting away the water which collects in this part of the guard.

The guard is preferably supported for rotary adjustment on the motor arm 10, as indicated in Fig. 3, a socket 25 being provided which is secured in position by means of the thumb screw 26. The guard is also provided with the pairs of inwardly projecting lips 27 and 28 fitting over the edge of the sheet 3. The lips 28 serve to support the outer edge of the glass sheet which is cut off, so that it will not fall down into the guard and interfere with the operation of the cutting wheels. As indicated in Fig. 1ª, the guards 21 and 22 are slotted where the axles of the motor shafts pass therethrough in order to permit the rotary adjustment of the guards, suitable strips of rubber or the like being carried by the axles in order to overlap and close the ends of the slots.

Figs. 5, 6 and 7 illustrate a modification for cutting large sheets into sections, the tables in this case being supported upon the tracks 31 and 32. These tables are fed along the tracks to carry the glass between the cutting wheels 33 and 34 by means of the feed screws 35 and 36. These screws are driven from the motor 37 by means of suitable worm reducers located in the casings 38 and 39. The sheet to be severed is secured to the two tables by means of suitable clamps which are carried by the T-slots 40 extending transversely of the tables. The wheels 33 and 34 are driven by the motors 41 and 42 carried by sliding heads 43 and 44, such heads being guided upon fixed brackets 45 and 46, the lower of which is supported from the floor, while the upper one is supported from the overhead beam 47. The heads 43 and 44 are adjusted up and down by means of threaded rods which engage nuts carried by the heads and are provided at their ends with the bevel gears 48 and 49. These bevel gears are driven from other gears 50 and 51 carried by the shafts 52 and 53, these shafts carrying suitable hand wheels 54 and 55 at their outer ends. This arrangement provides for an adjustment of the vertical position of the cutting wheels in order to govern the depth which the wheels cut into the glass. Also supported upon the motor framing are the guard members 56 and 57, the lower one of which is provided with the drainage pipe 58. Water is supplied to the wheels through the nozzles 59 and 60. Reversal of the motor 37, in order to bring the tables back to starting position, may be accomplished automatically, if desired. This may be done by the use of a reversing switch 61 operated by a trip 63 carried by the table. Similarly, the rotation of the motor may be automatically stopped when the tables arrive at their starting position, as illustrated, the stop member 63 carried by the table at such time operating a limiting switch 62.

Fig. 8 illustrates another modification of the invention, wherein a multiple cutting unit is employed. This multiple unit comprises three pairs of cutting wheels 64, 65 and 66 carried by the shafts 67 and 68 driven from the motors 69 and 70. The motors are in this case mounted upon an arm 71 as in the Fig. 1 construction, this arm being adjustable rotarily by means of the worm wheel 72. The guard member 73 is supported at one end upon the motor arm 71 and at its other end is provided with a pivot 74 carried by the pedestal 75. The guard member 73 is made relatively heavy and rigid and acts as a support for the yokes 76, 77 and 78. The yokes are in the form of flanged ribs projecting inward from the casing 73 with which they are integral. These yokes are provided with a series of bearings 79, 79, etc. for the shafts 67 and 68. The cutting wheels 64, 65 and 66 are preferably splined on the shafts 67 and 68, so that they may be adjustable therealong to give different spacings between the lines of cut and are held in adjusted position by yokes 80, 80, etc., which are slidably mounted on the yokes 76, 77 and 78, being held in position by means of suitable clamping screws, not shown. In this type of construction, the glass sheet 81 to be cut into a plurality of sections is supported upon an endless conveyor 82 of the chain or link type, which is caused to pass through the guard member 73 and past the various pairs of cutting wheels.

Only one cutting wheel is shown on each side of the sheet in the embodiment of the invention, as described and illustrated; but it will be understood that the invention is not limited to this arrangement, and that when it is desired to cut rapidly, a plurality of wheels may be employed in series on each side of the sheet, each of such wheels cutting only a part of the depth on each side.

What I claim is:

1. In apparatus for cutting sheets, a supporting frame mounted for swinging adjustable movement about an axis intermediate the ends of the frame, a motor carried by each end of the frame, thin disc cutting wheels upon the drive shafts of the motors and lying in the same plane, means for giving the sheet of material to be cut a movement relative to the wheels, so that each wheel cuts a part of the way through the sheet, and a pair of guard members surrounding the wheels, and mounted for pivotal adjustment upon said frame on an axis concentric with that about which said frame is adjustable.

2. In apparatus for cutting sheets, a supporting frame mounted for swinging adjustable movement about an axis intermediate the ends of the frame, a motor carried by each end of the frame, thin disc cutting wheels upon the drive shafts of the motors and lying in the same plane, means for giving the sheet of material to be cut a movement relative to the wheels, so that each wheel cuts a part of the way through the sheet, a pair of guard members surrounding the wheels and mounted for pivotal adjustment upon the frame on an axis concentric with that about which said frame is adjustable, and a support for the edge of the sheet carried by one of said guards.

3. In apparatus for cutting sheets, a supporting frame mounted for swinging adjustable movement about an axis intermediate the ends of the frame, a motor carried by each end of the frame, thin disc cutting wheels upon the drive shafts of the motors and lying in the same plane, means for giving the sheet of material to be cut a movement relative to the wheels, so that each wheel cuts a part of the way through the sheet, a pair of guard members surrounding the wheel and mounted for pivotal adjustment upon the frame on an axis concentric with that about which said frame is adjustable, and a pair of spaced supports for the edge of the sheet carried by said guards.

In testimony whereof, I have hereunto subscribed my name this 28th day of Sept., 1927.

WILLIAM OWEN.